United States Patent
Bruno

(10) Patent No.: US 10,704,690 B2
(45) Date of Patent: Jul. 7, 2020

(54) PISTON RING

(71) Applicants: Mahle Metal Leve S/A, Jundiai (BR); Mahle International GmbH, Stuttgart (DE)

(72) Inventor: Rafael Antonio Bruno, Sao Paulo (BR)

(73) Assignees: Mahle Metal Leve S/A (BR); Mahle International GmbH (DE)

( * ) Notice: Subject to any disclaimer, the term of this patent is extended or adjusted under 35 U.S.C. 154(b) by 119 days.

(21) Appl. No.: 15/571,821

(22) PCT Filed: Apr. 28, 2016

(86) PCT No.: PCT/EP2016/059527
§ 371 (c)(1),
(2) Date: Nov. 3, 2017

(87) PCT Pub. No.: WO2016/177626
PCT Pub. Date: Nov. 10, 2016

(65) Prior Publication Data
US 2018/0347695 A1 Dec. 6, 2018

(30) Foreign Application Priority Data
May 5, 2015 (BR) ............................ 102015010736

(51) Int. Cl.
*F16J 9/26* (2006.01)
(52) U.S. Cl.
CPC ........................................ *F16J 9/26* (2013.01)
(58) Field of Classification Search
CPC .......................................................... F16J 9/26
See application file for complete search history.

(56) References Cited

U.S. PATENT DOCUMENTS 5,316,321 A * 5/1994 Ishida ...................... F16J 9/26
 277/443
5,405,154 A * 4/1995 Tsuchiya ................ B23P 15/06
 277/443

(Continued)

FOREIGN PATENT DOCUMENTS

DE 102005023627 A1 11/2006
EP 2520833 A2 * 11/2012 ............... C23C 8/02

(Continued)

OTHER PUBLICATIONS

English abstract for JP-3090520.
English abstract for DE-102005023627.

*Primary Examiner* — Kristina R Fulton
*Assistant Examiner* — L. Susmitha Koneru
(74) *Attorney, Agent, or Firm* — Fishman Stewart PLLC

(57) ABSTRACT

A piston ring may have a base with a sliding external surface, an internal surface, an upper surface, and a lower surface, the external surface having chamfered edges. The external surface, the internal surface, the upper surface, the lower surface, and the chamfered edges may have a coating provided with a nitrided first layer having a thickness of up to 2% of a nominal axial thickness of the ring when applied to the upper surface and the lower surface, and a thickness of up to 10% in relation to the thickness of the first layer applied to the upper surface and the lower surfaces when applied to the external surface and to the chamfered edges. The external surface and the chamfered edges may include a sliding layer having one of a hard chromium or ceramic chromium plated coating, the sliding layer being applied on the first layer, the sliding layer having a thickness of between 80 and 175 microns.

15 Claims, 2 Drawing Sheets

(56) References Cited

U.S. PATENT DOCUMENTS

| | | | | |
|---|---|---|---|---|
| 5,582,414 A | * | 12/1996 | Miyazaki | C23C 14/0641 |
| | | | | 277/444 |
| 6,508,473 B1 | * | 1/2003 | Tanaka | C23C 14/0641 |
| | | | | 277/440 |
| 2002/0117808 A1 | * | 8/2002 | Ogawa | C23C 8/26 |
| | | | | 277/443 |
| 2006/0269790 A1 | * | 11/2006 | Sarabanda | C23C 14/025 |
| | | | | 428/698 |
| 2009/0278320 A1 | * | 11/2009 | Araujo | C23C 14/0036 |
| | | | | 277/442 |
| 2013/0328274 A1 | * | 12/2013 | Sugiura | F16J 9/20 |
| | | | | 277/444 |

FOREIGN PATENT DOCUMENTS

| | | |
|---|---|---|
| JP | 3090520 B2 | 9/2000 |
| WO | WO-2007/147532 A2 | 12/2007 |

* cited by examiner

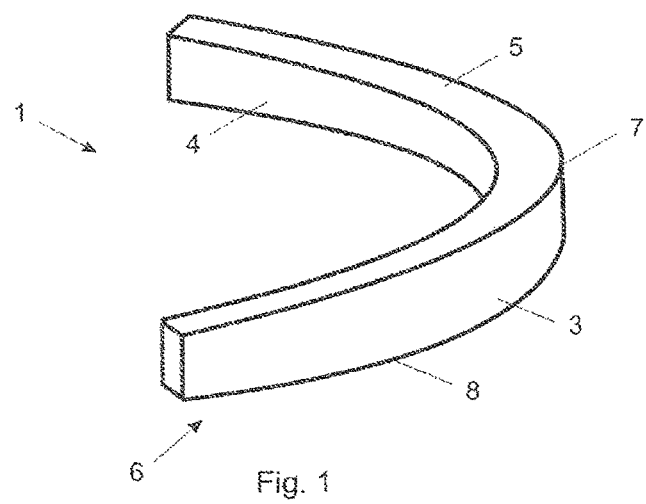
Fig. 1
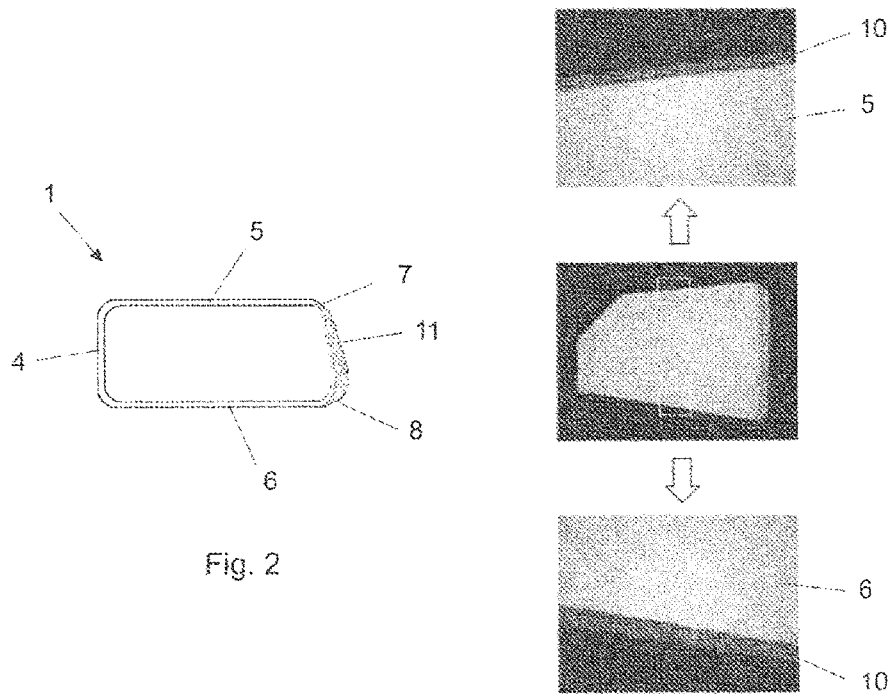
Fig. 2
Fig. 3

PISTON RING

CROSS-REFERENCE TO RELATED APPLICATIONS

This application claims priority to International Patent Application No. PCT/EP2016/059527, filed on Apr. 28, 2016 and Brazilian Patent Application No. BR 10 2015 010736, filed on May 5, 2015, the contents of both of which are included herein by reference in their entireties.

TECHNICAL FIELD

The present invention relates to a piston ring for internal combustion engines, the piston ring comprising a coating composed of a nitriding treatment and at least one surface of the ring comprising a hard chromium or ceramic chromium plated coating.

BACKGROUND

Whether they are Diesel cycle, Otto cycle, two stroke or three stroke engines, internal combustion engines comprise at least one piston ring. The piston ring seals the space between the cylinder sleeve and the piston head, insulating the combustion chamber from the other internal engine components. The piston ring is arranged radially in the base of the piston head, preventing the combustion gases from escaping from the combustion chamber in the direction of the casing, and preventing the engine oil from penetrating the combustion chamber. Usually, engines are provided with three rings placed in parallel in grooves arranged in the base of the head.

Certain internal combustion engines, principally those operating on a diesel cycle, work under high load. These engines operate at low speed with high power and therefore are more demanding in terms of their mechanical components. Thus, the rings used in such high-power engines need to be highly wear-resistant, not only on the external surface but also on the upper and lower surfaces of the rings.

Prior art piston rings generally comprise a stainless steel base with a nitride coating deposited on the external, internal, upper and lower surfaces and on the chamfers of the rings.

Patent document DE 10 2005 023 627 discloses a piston ring provided with a nitride coating and a hard chromium coating deposited on the external surface of the ring. However, the document does not disclose a complete solution since the ring, which is the subject matter of the invention, has only one of the edges of the external surface chamfered and with a hard chromium coating. That is to say, the hard chromium coating is applied partially on the external surface, thereby reducing wear-resistance.

Furthermore, documents JP 3090520 and U.S. Pat. No. 6,508,473 disclose piston rings provided with a nitride coating applied to the internal, upper, and lower surfaces, and a hard chromium coating applied using a physical vapor deposition (PVD) process to the external surfaces of the rings.

These documents disclose, as disadvantage, PVD coatings that are limited to smaller thicknesses and thus coatings that are restricted in use in terms of durability. In addition to promoting the ring fatigue process through the compressive action of the PVD layer on the nitriding.

It is therefore necessary to find a piston ring comprising a nitride coating combined with a plated coating composed of chromium deposited in the most critical region of the ring, which is defined as the external surface and the chamfered edges, the ring offering a high level of durability owing to excellent resistance to wear on the various faces and the respective, sleeve and piston, contact moments.

SUMMARY

The object of the present invention is to provide a piston ring for internal combustion engines, particularly engines operating at high load and high power, the ring comprising a nitride coating arranged on the external surface of the ring in order to guarantee greater fatigue-resistance.

A further object of the present invention is to provide a piston ring comprising at least one surface provided with a chromium plated coating, particularly a critical surface of the ring, namely an external surface and the chamfered edges.

A further object of the present invention is to provide a piston ring that has a high level of durability owing to excellent wear-resistance.

Lastly, an object of the present invention is to provide a piston ring comprising a hardness of up to 500 HV (Vickers hardness) measured at a depth of 20 microns, and at least one surface with a hardness of between 700 and 1200 HV (Vickers hardness).

The objects of the present invention are achieved by a piston ring for internal combustion engines provided with a base comprising a sliding external surface, an internal surface, an upper surface, and a lower surface, the external surface comprising chamfered edges, the external, internal, upper, and lower surfaces and the chamfered edges of the ring comprise a coating provided with a first, nitrided layer, the first layer comprising a thickness of up to 2% of the nominal axial thickness of the ring when applied to the upper and lower surfaces and a thickness of up to 10% in relation to the thickness of the first layer applied to the upper and lower surfaces when applied to the external surface and to the chamfered edges, the external surface and the chamfered edges comprising a sliding layer composed of a hard chromium or ceramic chromium plated coating, the sliding layer being applied on the first layer, the sliding layer comprising a thickness of between 80 and 175 microns.

The objects of the present invention are further achieved by a piston ring comprising a stainless steel base with 10% to 17% by weight of chromium on which are deposited a first layer and a sliding layer, the first layer comprising a thickness of between 30 and 50 microns and a hardness of 500 HV (Vickers hardness) when measured at a depth of 20 microns, in the upper and lower surfaces, and a sliding layer comprising a hardness of between 700 and 1200 HV (Vickers hardness).

The objects of the present invention are likewise achieved by an internal combustion engine comprising at least one piston ring as defined above.

BRIEF DESCRIPTION OF THE DRAWINGS

The present invention will be described in greater detail below on the basis of an exemplary embodiment represented in the drawings. The figures show:

FIG. 1—a perspective view of a piston ring with all its component parts;

FIG. 2—a transverse section through the piston ring of the present invention;

FIG. 3—a transverse section representing the application of the coating of the present invention to the upper and lower surfaces of the ring;

DETAILED DESCRIPTION

Figure 4:
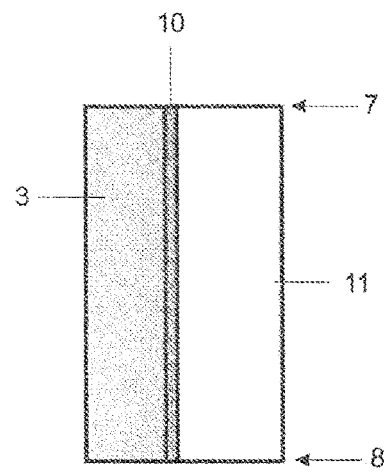
FIG. 4—schematic drawing of a transverse section representing the application of the coating in a first embodiment of the present invention to the external surface of the ring.

The present invention relates to a piston ring for internal combustion engines, the piston ring comprising a nitride coating, at least one surface of the ring comprising a hard chromium or ceramic chromium plated coating.

FIG. 1 shows a metal piston ring 1 provided with a substantially annular base, comprising stainless steel with 10% to 17% by weight of chromium and being provided with an external surface 3, an internal surface 4, an upper surface 5, and a lower surface 6. The external surface 3 acts as sliding portion in the interface between the ring 1 and a cylinder sleeve, while the internal surface 4 is associated with a wall of a piston and the upper 5 and lower 6 surfaces are associated with the piston groove.

The intersection between the external surface 3 and the upper surface 5 comprises a first chamfered edge 7, while the intersection between the external surface 3 and the lower surface 6 comprises a second chamfered edge 8 (see FIG. 2).

The piston ring 1 of the present invention is provided with a base on which are deposited a first, nitride layer 10 and a sliding layer 11, which comprises a hard chromium or ceramic chromium plated coating.

The first, nitride layer 10 is applied to the external 3, internal 4, upper 5, and lower 6 surfaces and to the chamfered edges 7, 8 of the ring, such that the thickness of this first layer 10 is different for each surface.

The piston ring 1 comprises a nominal thickness, the distance between the upper surface 5 and the lower surface 6, of between 3.0 and 4.0 millimeters. Thus, the thickness of the first nitride layer 10 applied to the upper 5 and lower 6 surfaces must not exceed 2% of the nominal axial thickness of the ring 1. Taking the nominal thickness of the ring 1 into consideration, the first layer 10 comprises a thickness of between 60 and 70 microns applied to the upper 5 and lower 6 surfaces.

Figure 6:
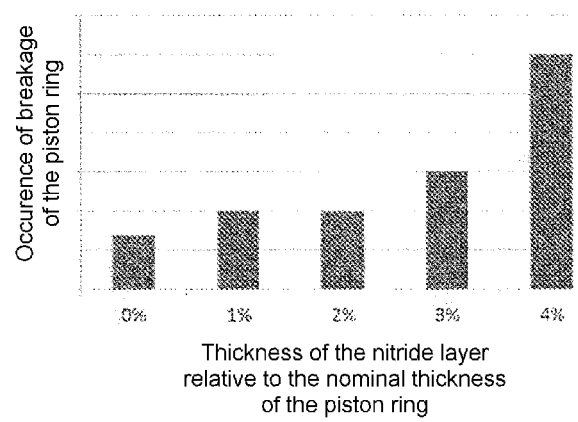
FIG. 6—a graph representing the relationship between piston ring durability and the thickness of the nitride coating applied to the upper and lower surfaces of the ring relative to the ring thickness.

By studying FIG. 6 it is possible to understand that the value of 2% of the nominal thickness of the ring 1 represents an optimum value for the thickness of the first layer 10. This value guarantees application of the first layer 10, acting in such a manner as to raise the wear-resistance without this first nitride layer 10 compromising the robustness of the ring 1. Were values of 3%, 4%, etc. relative to the nominal thickness of the ring 1 to be used, the incidence of breakage of the ring 1 significantly increases, such that said layer compromises the structure of the ring 1.

In a preferred configuration, the first layer 10 comprises a thickness of between 30 and 50 microns applied to the upper 5 and lower 6 surfaces of the ring 1 (see FIG. 3).

In addition, the first layer 10 may be applied to the external surface 3 and to the chamfered edges 7, 8 of the ring 1, but with a smaller thickness. The thickness of the first layer 10 applied to the external surface 3 and to the chamfered edges 7, 8 must not exceed 10% of the thickness of the first layer 10 applied to the upper 5 and lower 6 surfaces.

Thus, the thickness of the first layer 10 applied to the external surface 3 and to the chamfered edges 7, 8 is between 6 and 7 microns. In a preferred configuration, the first layer 10 applied to the external surface 3 and to the chamfered edges 7, 8 has a thickness of between 3 and 5 microns (see FIG. 4).

These proportions between the nominal thickness of the ring 1 and the thicknesses of the first layer 10 applied to the external 3, upper 5, and lower 6 surfaces and to the chamfered edges 7, 8 guarantee that the ring 1 will have a high level of durability and improved performance levels when in operation.

The ring 1 of the present invention also comprises a sliding layer 11 applied to the first layer 10 on the external surface 3 and the chamfered edges 7, 8. The sliding layer 11 comprises a plated coating composed of hard chromium or ceramic chromium, with a thickness equal to or greater than 100 microns.

In the preferred configuration, the sliding layer 11 of the present invention has a thickness of up to 5% of the nominal thickness of the ring 1. Once again, taking the nominal thickness of the ring 1 into consideration, the sliding layer 11 has a thickness of between 80 and 175 microns.

Figure 5:
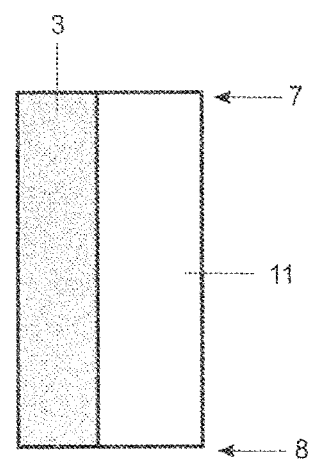
FIG. 5—a schematic drawing of a transverse section representing the application of the coating in a second embodiment of the present invention to the external surface of the ring.

In another possible configuration, the first layer 10 is applied only to the internal 4, upper 5, and lower 6 surfaces. Thus, the external surface 3 and the chamfered edges 7, 8 comprise only the sliding layer 11 (see FIG. 5).

Furthermore, the first layer 10 has a minimum hardness of 500 HV (Vickers hardness) when measured at a depth of 20 microns, in the upper 5 and lower 6 surfaces of the ring 1, and the sliding layer 11 has a hardness of between 700 and 1200 HV (Vickers hardness) on the external surface 3 and the chamfered edges 7, 8.

In sum, by means of the proportions of the thicknesses of the first layer 10 and of the sliding layer 11, the present invention successfully guarantees a high level of durability owing to the excellent wear-resistance achieved, without compromising fatigue-resistance.

A preferred exemplary embodiment having been described, it must be understood that the scope of the present invention covers other possible variations, being limited only by the content of the appended claims, which include those possible equivalents.

The invention claimed is:

1. A piston ring for internal combustion engines, comprising a base having a sliding external surface, an internal surface, an upper surface, and a lower surface, the external surface having chamfered edges;
    wherein the external surface, the internal surface, the upper surface, the lower surface, and the chamfered edges have a coating with a nitrided first layer provided directly thereon, wherein a thickness of the first layer on the upper surface and the lower surface is greater than 0% up to 2% of a nominal axial thickness of the ring, and a thickness of the first layer on the external surface and the chamfered edges is greater than 0% up to 10% of the thickness of the first layer on the upper surface and the lower surface; and
    wherein the external surface and the chamfered edges include a sliding layer having one of a hard chromium or ceramic chromium plated coating, the sliding layer being applied on the first layer, the sliding layer having a thickness of between 80 and 175 microns.

2. The piston ring as claimed in claim 1, wherein the base is a stainless steel base with 10% to 17% by weight of chromium on which the first layer and the sliding layer are deposited.

3. The piston ring as claimed in claim 1, wherein the first layer has a thickness of between 30 and 50 microns on the upper surface and the lower surface.

4. The piston ring as claimed in claim 1, wherein the first layer has a minimum hardness of 500 HV (Vickers hardness) at a depth of 20 microns in the upper surface and the lower surface.

5. The piston ring as claimed in claim 1, wherein the sliding layer includes a hardness of between 700 and 1200 HV (Vickers hardness).

6. An internal combustion engine comprising at least one piston ring including a base having a sliding external surface, an internal surface, an upper surface, and a lower surface, the external surface having chamfered edges;
   wherein the external surface, the internal surface, the upper surface, the lower surface, and the chamfered edges have a coating with a nitrided first layer provided directly thereon, wherein a thickness of the first layer on the upper surface and the lower surface is greater than 0% up to 2% of a nominal axial thickness of the ring, and a thickness of the first layer on the external surface and the chamfered edges is greater than 0% up to 10% of the thickness of the first layer on the upper surface and the lower surface; and
   wherein the external surface and the chamfered edges include a sliding layer having one of a hard chromium or ceramic chromium plated coating, the sliding layer being applied on the first layer, the sliding layer having a thickness of between 80 and 175 microns.

7. The internal combustion engine as claimed in claim 6, wherein the base is a stainless steel base with 10% to 17% by weight of chromium on which the first layer and the sliding layer are deposited.

8. The internal combustion engine as claimed in claim 6, wherein the first layer has a thickness of between 30 and 50 microns on the upper surface and the lower surface.

9. The internal combustion engine as claimed in claim 6, wherein the first layer has a minimum hardness of 500 HV (Vickers hardness) at a depth of 20 microns in the upper surface and the lower surface.

10. The internal combustion engine as claimed in claim 6, wherein the sliding layer includes a hardness of between 700 and 1200 HV (Vickers hardness).

11. A piston ring comprising:
    a base having an outer diameter, an inner diameter, an upper surface, a lower surface and chamfered edges respectively connecting the upper surface and the lower surface with the outer diameter;
    a coating provided only on the inner diameter, the upper surface, and the lower surface, the coating having a nitrided first layer with a thickness of greater than 0% up to 2% of a nominal axial thickness of the ring on the upper surface and the lower surface; and
    a sliding layer provided on the outer diameter and the chamfered edges, the sliding layer having one of a hard chromium or ceramic chromium plated coating, the sliding layer being applied on the first layer, the sliding layer having a thickness of between 80 and 175 microns;
    wherein the base is a stainless steel base with 10% to 17% by weight of chromium on which the first layer and the sliding layer are deposited.

12. The piston ring as claimed in claim 11, wherein the first layer has a thickness of between 30 and 50 microns on the upper surface and the lower surface.

13. The piston ring as claimed in claim 11, wherein the first layer has a minimum hardness of 500 HV (Vickers hardness) at a depth of 20 microns in the upper surface and the lower surface.

14. The piston ring as claimed in claim 11, wherein the sliding layer includes a hardness of between 700 and 1200 HV (Vickers hardness).

15. The piston ring as claimed in claim 1, wherein the thickness of the first layer is different for each of the surfaces.

* * * * *